United States Patent [19]

Grube et al.

[11] Patent Number: 5,060,296
[45] Date of Patent: Oct. 22, 1991

[54] COMMUNICATION SYSTEM WITH SQUELCH CONTROL

[75] Inventors: Gary W. Grube, Palatine; Robert F. Molnar, Crystal Lake, both of Ill.

[73] Assignee: Motorola, Inc., Schaumberg, Ill.

[21] Appl. No.: 316,738

[22] Filed: Feb. 28, 1989

[51] Int. Cl.$^5$ ............................................. H04B 1/10
[52] U.S. Cl. ...................................... 455/218; 455/34; 455/35; 455/53
[58] Field of Search ................... 455/218, 221, 34, 35, 455/36, 37, 53, 54, 7, 11, 13

[56] References Cited

U.S. PATENT DOCUMENTS

| | | |
|---|---|---|
| Re. 32,789 | 11/1988 | Lynk, Jr. et al. ..................... 379/58 |
| 3,654,555 | 4/1972 | Ryan et al. |
| 3,660,765 | 5/1972 | Glasser et al. |
| 3,902,122 | 8/1975 | Sisson et al. |
| 3,962,645 | 6/1976 | Stewart |
| 4,020,421 | 4/1977 | Elder et al. |
| 4,132,953 | 1/1979 | Martin, III |
| 4,234,959 | 11/1980 | Andrea, III et al. ................. 455/35 |
| 4,344,175 | 8/1982 | Leslie ....................................... 375/5 |
| 4,430,742 | 2/1984 | Milleker et al. ........................ 375/5 |
| 4,455,664 | 6/1984 | Burke .................................... 375/104 |
| 4,541,118 | 9/1985 | Eastmond et al. .................... 455/35 |
| 4,554,665 | 11/1985 | Beesley ................................. 371/55 |
| 4,573,206 | 2/1986 | Grauel et al. ......................... 455/34 |
| 4,783,845 | 11/1988 | McChesney et al. ................. 455/35 |

Primary Examiner—Douglas W. Olms
Assistant Examiner—Ralph Smith
Attorney, Agent, or Firm—Jon P. Christensen

[57] ABSTRACT

A trunked communication system (100) wherein an EOT (308) as transmitted by a communication unit (103) is used by the system to initiate a squelch methodology, but is not used by the resource controller (101) to determine reallocation of the communication resources.

13 Claims, 1 Drawing Sheet

COMMUNICATION SYSTEM WITH SQUELCH CONTROL

TECHNICAL FIELD

This invention relates generally to trunked communication systems.

BACKGROUND ART

Trunked communication systems are known in the art. In general, such systems include a resource controller (which may be centrally located or distributed) that manages communications between communication units (such as fixed location, mobile, and portable two-way radios) on a plurality of communication resources (such as frequency pairs or TDM time slots).

A number of such systems are available, including the Smartnet and Privacy Plus systems from Motorola, the ClearChannel system from E. F. Johnson, and the Sixteen Plus and Sweet Sixteen systems from General Electric. Depending upon the specific needs of a particular user, these systems may not provide the exact services required.

SUMMARY OF THE INVENTION

This invention is responsive to such needs through provision of a communication system that routes RF communications over a limited number of communication resources, such as RF information channels. The communication system generally includes a resource controller having a transceiver unit, a channel monitoring unit, and a control unit. The transceiver unit transceives signalling information regarding information channel usage messages and information channel usage acknowledgments between the resource controller and the communication units. The channel monitoring unit functions to monitor information channel usage and determines when an information channel no longer continues to support communication activity. The control unit responds to inputs from the transceiver unit and the channel monitoring unit, and further functions to process information channel usage messages, such as information channel requests from the communication units, and acknowledges usage of identified information channels by the communication units. The control unit also functions to make available previously used information channels.

In one embodiment, the control unit acknowledges usage of identified information channels by actively assigning communication units to identified information channels, and makes previously used information channels subsequently available by actively de-assigning such previously assigned information channels.

In general, the resource controller functions to control communications between the various communication units. The resource controller monitors channel usage, and when a channel has been unused for more than a predetermined period of time, the resource controller makes the channel available for use by other communication units.

The system also includes a squelch unit that is functionally independent of the resource controller. This squelch unit will typically reside in a repeater associated with the information channel in use, and will respond to a squelch activation signal transmitted by a communication unit. When receiving this squelch activation signal, the squelch unit will transmit a signal via the repeater that causes other communication units using that particular communication channel to squelch.

The squelch activation signal functions only to initiate the squelch function, and is not used by the resource controller to identify a channel as now being available, or to cause deassignment of a channel.

BEST MODE FOR CARRYING OUT THE INVENTION

Figure 1:
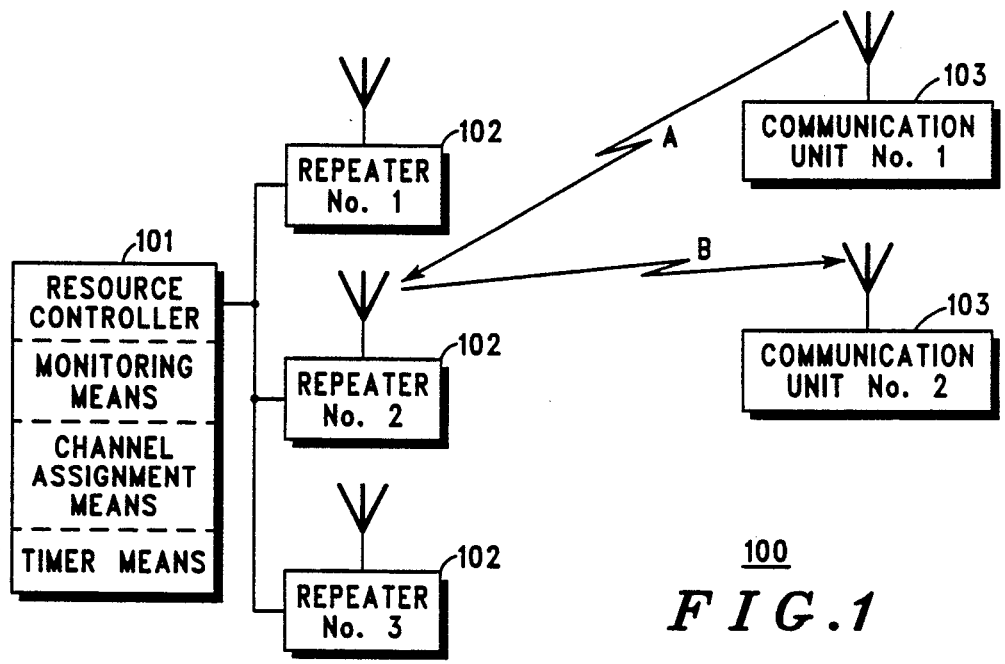
FIG. 1 comprises a block diagram depiction of the system.

In FIG. 1, the system can be seen as generally depicted by the numeral 100. The system (100) includes a resource controller (101) that manages communication resource allocation. The resource controller (101) connects operably to a plurality of repeaters (102), there typically being one repeater for each communication path (in a TDM system, of course, each repeater might support a plurality of communication paths as represented by multiple TDM time slots). In this particular embodiment, the operation of the repeaters (102) is generally controlled by the resource controller (101) to provide for a controlled allocation of communication resources. In an equivalent embodiment, the resource controller function could be distributed amongst the repeaters (102) and the allocation function could be handled in a distributed manner in a known fashion.

Communication units (103) communicate with one another through the repeaters (102) as allowed and otherwise controlled by the resource controller (101). For example, communication unit 1 would transmit a message A to repeater 2 as allowed or assigned by the resource controller (101). Repeater 2 would then retransmit that signal as signal B to communication unit 2.

Figure 2:
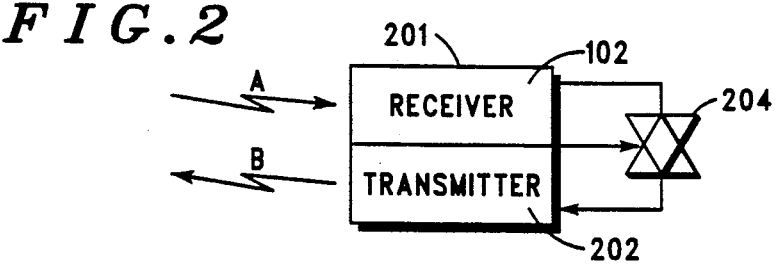
FIG. 2 comprises a block diagram depiction of a repeater.

Referring to FIG. 2, each repeater (102) includes a receiver (201) and a transmitter (202). The signal A as referred to above would be received by the receiver (201) and would be routed to the transmitter (202) through an appropriate mute gate (204) to allow retransmission as signal B. The mute gate (204) is controlled by the receiver (201) as a function of the contents of the received signal, or also as a function of the loss of receiving the incoming signal, as appropriate to the particular application.

Such trunked communication systems and repeater structure are well known in the art, and hence no additional detailed description need be set forth here.

Figure 3:
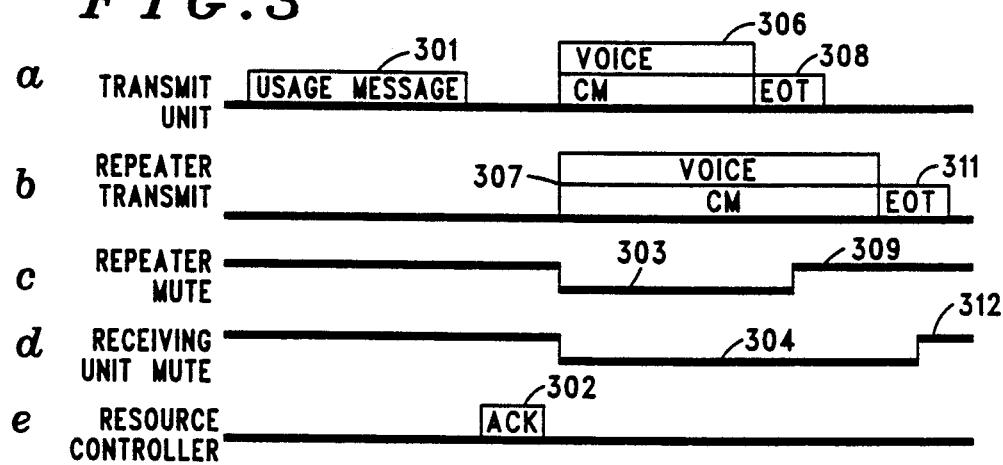
FIG. 3 comprises timing diagrams depicting operation of the invention.

Referring to FIG. 3, operation of the invention can be described. To begin, a communication unit (103) that seeks to initiate a communication will transmit an appropriate usage message (301) (FIG. 3a) to the resource controller (101) (either on a dedicated control channel or on a signalling information path otherwise provided for use by the communication unit (103), as well understood in the art). The usage message (301) itself may be either a talk request or a statement of intended usage, depending upon the general methodology of the system. Upon receiving the usage message (301), the resource controller transmits an appropriate acknowledgment signal (302) (FIG. 3e). This acknowledgment signal (302) may be a channel assignment grant as appropriate for responding to a talk request, or a simple acknowledgment when responding to a statement regarding intended usage as noted above.

Upon receiving the acknowledgment signal (302) from the resource controller, the transmitting unit then transmits its voice information (usually in tandem with an appropriate channel maintenance signal) (306) (FIG. 3a). The repeater appropriated for use by the communication unit will receive this communication (306) and, since the repeater mute is disabled (303) (FIG. 3c), the repeater will retransmit the voice information (along with an appropriate channel maintenance signal as required for the system) (307) (FIG. 3b). The intended receiving communication units will likewise be unmuted (304) (FIG. 3d) and will receive the transmitted voice information and render it audible for benefit of the user.

At the conclusion of its transmission, the transmitting unit will transmit an EOT (308) (FIG. 3a) (end of transmission signal). Important to this invention, the resource controller ignores receipt of the EOT (308). The repeater, however, upon detection of the EOT (308), will mute (309) (FIG. 3c). The repeater will continue to transmit a signal to the receiving units, since the receiving units have not yet muted and would otherwise produce an audible noise signal that would likely distract or irritate the user. The repeater then subsequently transmits its own EOT (311) (FIG. 3b). Upon receipt of this EOT (311) the receiving units mute (312). Thereafter, the repeater ceases transmissions.

Meanwhile, the resource controller will have detected the absence of use of the communication resource due to the lack of carrier. After a predetermined duration of time (determined by a timer as well understood in the art), the resource controller will make that particular communication resource available to other communication units for subsequent use. Importantly, the resource controller does not determine the necessity of reallocation as a function of the EOT (308) as transmitted by the communication unit. Instead, the resource controller monitors for non-use of the channel. The EOT (308) is instead used to initiate a squelch process for the benefit of the other receiving communication units.

We claim:

1. A communication system for routing communications between communication units over a limited number of information channels, said communication system comprising:
   a) a resource controller including:
   transceiver means for transceiving signalling information regarding information channel requests and information channel grants between the resource controller and the communication units;
   channel monitoring means for determining, at least from time to time, whether an assigned information channel continues to support communication activity; and
   channel assigning means, responsive to said transceiver means and said channel monitoring means, for processing information channel requests from said communication units, assigning communication units to identified information channels, and de-assigning previously assigned information channels;
   b) squelch means, independent of the channel assigning means and responsive to a squelch activation signal as transmitted by a communication unit, for causing other communication units assigned to said communication channel to squelch.

2. The system of claim 1 wherein the transceiver means includes a plurality of repeaters, there being at least one repeater for each of the information channels.

3. The system of claim 1 wherein the transceiver means includes a dedicated control channel for supporting the signalling information.

4. The system of claim 1 wherein the channel assigning means includes timer means for timing how long a particular assigned information channel does not support communication activity.

5. The system of claim 4 wherein the channel assigning means de-assigns information channels in response to the timer means.

6. The system of claim 1 wherein the squelch means causes the other communication units to squelch before the channel assigning means de-assigns the information channel assigned to the other communication units.

7. An RF communication system for routing RF communications between communication units over a limited number of RF communication resources said communication system comprising:
   a) a resource controller, including:
   transceiver means for transceiving signalling information regarding communication resource usage messages and communication resource usage acknowledgements between the resource controller and the communication units;
   resource monitoring means for determining, at least from time to time, whether a communication resource continues to support communication activity; and
   control means, responsive to the transceiver means and the resource monitoring means, for processing communication resource usage messages from the communication units, acknowledging usage of identified communication resources by the communication units, and making available previously used communication resources; and
   b) squelch means, independent of the control means and responsive to a squelch activation signal as transmitted by a communication unit, for causing other communication units using a particular communication resource to squelch.

8. The system of claim 7 wherein the transceiver means includes a plurality of repeaters, there being at least one repeater for each of the communication resources.

9. The system of claim 7 wherein the signalling information is transceived over the communication resources.

10. The system of claim 7 wherein the control means includes timer means for timing how long a particular used communication resource does not support communication activity.

11. The system of claim 10 wherein the control means makes previously used communication resources available in response to the timer means.

12. The system of claim 7 wherein the squelch means causes the other communication units to squelch before the control means makes available a communication resource that is being used by the other communication units.

13. In a communication system for routing communications between communication units over a limited number of information channels, the communication system including:

A) a resource controller;
B) a plurality of repeaters; and
C) a plurality of communication units;
a method of communicating, comprising:
at a first communication unit:
A) transmitting to the resource controller a first message regarding requested usage of an information channel;
at the resource controller:
B) receiving the first message;
C) transmitting a second message to the first communication unit to allow the first communication unit to make subsequent use of a particular information channel;
D) enabling a selected repeater to support communications from the first communication unit on the particular information channel;
at the first communication unit:
E) transmitting a third message on the particular information channel; at the selected repeater:
F) receiving the third message from the first communication unit;
G) repeating the third message to at least a second communication unit; at the first communication unit:
H) transmitting a fourth message on the particular information channel, comprising a predetermined signal, and thereafter terminating transmission;
at the resource controller:
I) detecting termination of transmissions from the first communication unit, and timing how long the particular information channel remains unused, and when the particular information channel remains unused for at least a predetermined period of time, allowing other communication units to use the particular information channel;
at the selected repeater:
J) receiving the fourth message from the first communication unit;
K) in response to receiving the fourth message, transmitting a fifth message on the particular information channel, comprising a predetermined signal; at the second communication unit:
L) receiving the fifth message on the particular information channel from the selected repeater;
M) in response to receiving the fifth message, squelching the second communication unit; at the selected repeater:
N) terminating transmission.

* * * * *